(12) United States Patent
Terada et al.

(10) Patent No.: US 11,830,023 B2
(45) Date of Patent: Nov. 28, 2023

(54) INFORMATION PROCESSING DEVICE, METHOD, AND MEDIUM

(71) Applicant: Rakuten Group, Inc., Tokyo (JP)

(72) Inventors: Eiji Terada, Tokyo (JP); Yui Kasahara, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/381,850

(22) Filed: Jul. 21, 2021

(65) Prior Publication Data

US 2022/0101363 A1 Mar. 31, 2022

(30) Foreign Application Priority Data

Sep. 29, 2020 (JP) .................................. 2020-162794

(51) Int. Cl.
*G06Q 30/0207* (2023.01)
*G06Q 30/0202* (2023.01)
*G06Q 30/0235* (2023.01)

(52) U.S. Cl.
CPC ..... *G06Q 30/0224* (2013.01); *G06Q 30/0202* (2013.01); *G06Q 30/0235* (2013.01)

(58) Field of Classification Search
CPC ........... G06Q 30/0224; G06Q 30/0202; G06Q 30/0235
USPC ....................... 705/14.25; 455/427
See application file for complete search history.

(56) References Cited

U.S. PATENT DOCUMENTS

2005/0255856 A1* 11/2005 Griffin .................. H04W 36/32
455/427
2021/0232478 A1* 7/2021 M Y .................... G06F 11/3438

FOREIGN PATENT DOCUMENTS

| JP | 2011-14048 A | | 1/2011 | |
|---|---|---|---|---|
| JP | 2011-242959 A | | 12/2011 | |
| JP | 2013-73489 A | | 4/2013 | |
| JP | 2018-132321 A | | 8/2018 | |
| JP | 2019160178 A | * | 9/2019 | |
| JP | 2020-047127 A | | 3/2020 | |
| JP | 2020047127 A | * | 3/2020 | |
| WO | WO-2008059692 A1 | * | 5/2008 | G06Q 30/02 |

OTHER PUBLICATIONS

Lotame, What Is Behavioral Targeting?, 2018 (Year: 2018).*

* cited by examiner

*Primary Examiner* — Tarek Elchanti
(74) *Attorney, Agent, or Firm* — Sughrue Mion, PLLC

(57) ABSTRACT

An information processing device includes an accompanier identifying unit for identifying one or more current or future accompaniers of a user, an action history extracting unit for extracting, from action history accumulated regarding the user, action history in which identification information of the one or more accompaniers identified by the accompanier identifying unit is correlated, and a content identifying unit for identifying content corresponding to the extracted action history, as the content to be provided to the user.

12 Claims, 7 Drawing Sheets

FIG.4

| USER ID | ACTION OF USER | DATE AND | FACILITY/SERVICE | ATTRIBUTES | ACCOMPANIER IDENTIFICATION INFORMATION |
|---|---|---|---|---|---|
| USER Y | BARCODE SETTLEMENT | 2020/1/7 | KOREAN BARBEQUE A | UPSCALE, BUSINESS | TERMINAL M, TERMINAL A, TERMINAL S |
| USER Y | POINTS USED | 2020/2/20 | B BURGER | REASONABLE, DINER | TERMINAL H |
| USER Y | POINTS USED | 2020/2/24 | C CHINESE RESTAURANT | REASONABLE, DINER | N/A |
| USER Y | POINTS IMPARTED | 2020/4/24 | JAPANESE-STYLE BAR D | PARTY, ALCOHOL | TERMINAL T |
| USER Y | CREDIT CARD SETTLEMENT | 2020/5/29 | E SUSHI | UPSCALE, BUSINESS | TERMINAL M, TERMINAL A |

FIG.5

| USER ID | CURRENT POSITION INFORMATION | ACCOMPANIER IDENTIFICATION INFORMATION | INFORMATION ACQUISITION DATE AND TIME |
|---|---|---|---|
| USER Y | X Y Z | TERMINAL M, TERMINAL A | yyyy/mm/dd~yyyy/mm/dd |
| USER M | | | |
| USER A | | | |

FIG.6

| CONTENT ID | FACILITY/SERVICE WHERE USABLE | ATTRIBUTES | PERIOD OF VALIDITY | LOCATIONS WHERE USABLE |
|---|---|---|---|---|
| COUPON 1 | B BURGER | REASONABLE, DINER, CAFE | 2020/01/01~2020/06/01 | FUTAKO-TAMAGAWA, . . . . |
| COUPON 2 | C CHINESE RESTAURANT | REASONABLE, DINER | yyyy/mm/dd~yyyy/mm/dd | |
| COUPON 3 | JAPANESE-STYLE BAR D | PARTY, ALCOHOL | yyyy/mm/dd~yyyy/mm/dd | |
| COUPON 4 | JAPANESE CUISINE F | UPSCALE, BUSINESS | yyyy/mm/dd~yyyy/mm/dd | FUTAKO-TAMAGAWA |
| COUPON 5 | CAFÉ G | CAFÉ, ALCOHOL | yyyy/mm/dd~yyyy/mm/dd | |

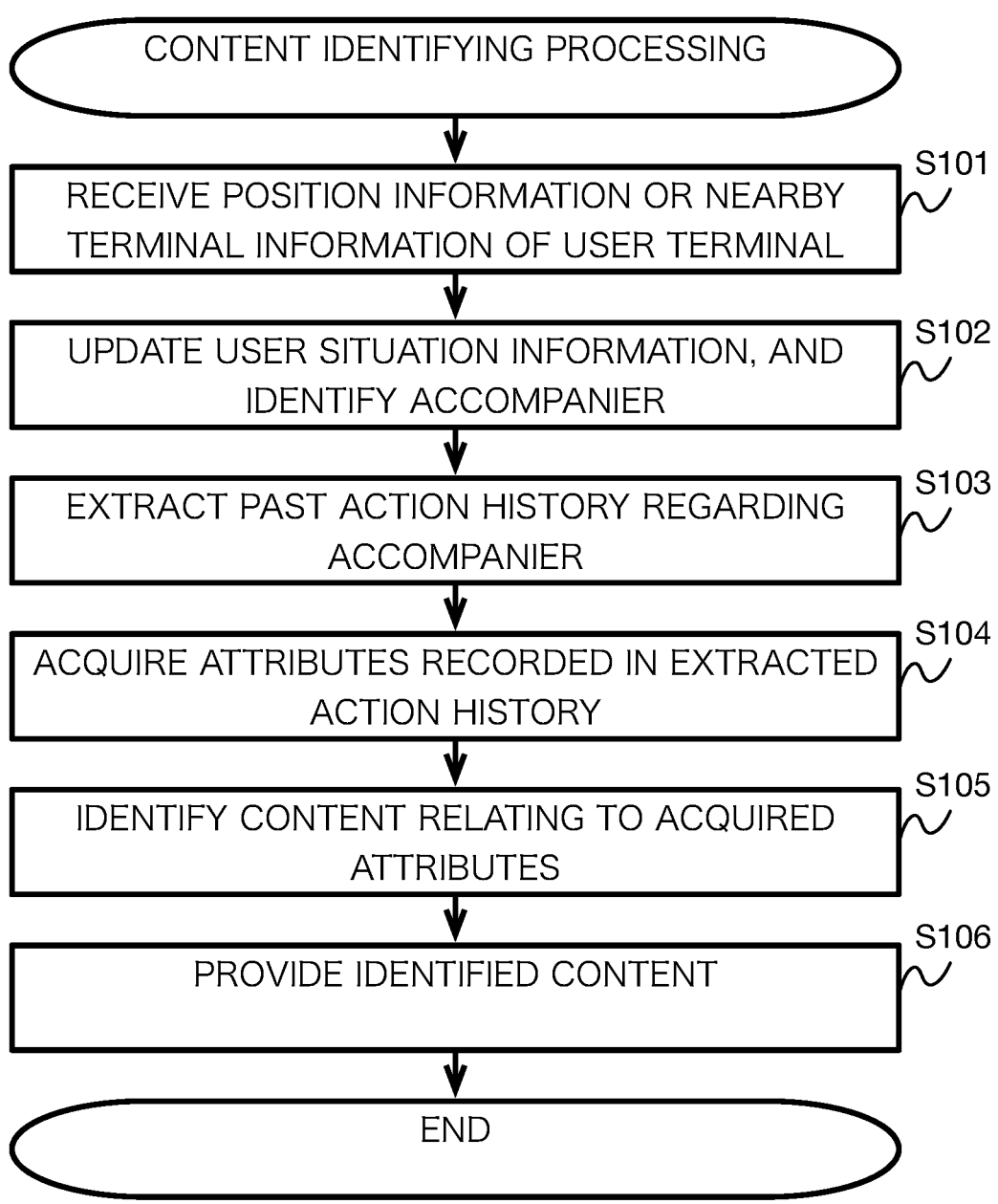

INFORMATION PROCESSING DEVICE, METHOD, AND MEDIUM

CROSS-REFERENCE TO RELATED APPLICATION(S)

This application claims priority to and the benefit of Japanese Patent Application No. 2020-162794, filed on Sep. 29, 2020, the disclosure of which is expressly incorporated herein by reference in its entirety for any purpose.

FIELD

The present disclosure relates to technology for identifying content provided to a user.

BACKGROUND

Conventionally, there has been proposed, as an information processing device capable of promoting usage of coupons, an information processing device including an acquiring unit that acquires information relating to context of a user, and a deciding unit that decides a valid period of content distributed to the user in accordance with information relating to the context acquired by the acquiring unit (see Japanese Patent Application Publication No. 2020-47127).

SUMMARY

There is conventionally known a distribution system that decides content such as electronic coupons or the like on the basis of attribute information registered in advance by users or the like, and distributes the content to the users. However, content decided simply on the basis of attribute information registered in advance may be inappropriate with regard to a situation that a user is currently in, and there are cases in which the distributed content is not advantageous to the user.

In light of the above-described problem, it is an object of present disclosure to identify content suitable for the situation that a user is currently in.

An example of the present disclosure is an information processing device, including: accompanier identifying means for identifying one or more current or future accompaniers of a user; action history extracting means for extracting, from action history accumulated regarding the user, action history in which identification information of the one or more accompaniers identified by the accompanier identifying means is correlated; and content identifying means for identifying content corresponding to the extracted action history, as content to be provided to the user.

The present disclosure can be comprehended as being a method executed by an information processing device, a system, or a computer, or as a program executed by a computer. The present disclosure can also be comprehended as being an arrangement where such a program is recorded in a recording medium that is readable by a computer or some other device, machine, or the like. The term "recording medium that is readable by a computer or the like" as used here is a recording medium where information such as data, programs, and so forth, is accumulated by electrical, magnetic, optical, mechanical, or chemical action, and can be read by a computer or the like thereby.

According to the present disclosure, content suitable for the situation that a user is currently in can be identified.

BRIEF DESCRIPTION OF THE DRAWINGS

FIG. 4 is a diagram illustrating an example of action history of a user accumulated in the embodiment;

FIG. 5 is a diagram illustrating an example of a data format of user situation information managed in the embodiment;

FIG. 6 is a diagram illustrating an overview of content management data for managing content provided to the user in the embodiment; and FIG. 7 is a flowchart showing the flow of content identifying processing according to the embodiment.

DESCRIPTION OF EMBODIMENTS

An embodiment of an information processing device, method, and program according to the present disclosure will be described below with reference to the Figures. Note however, that the description of the embodiment below is an exemplification of the embodiment, and does not limit the information processing device, method, and program according to the present disclosure to the specific configurations described below. In implementation, specific configurations are employed as appropriate in accordance with the form of implementation, and various alterations and modifications may be made.

In the present embodiment, an arrangement will be described in which the technology according to the present disclosure has been carried out in a system for distributing content such as coupons and so forth to users. Note however, that the technology according to the present disclosure is capable of being broadly used in technology for identifying content provided to users, and the object of application of the present disclosure is not limited to the example shown in the embodiment.

System Configuration

Figure 1:
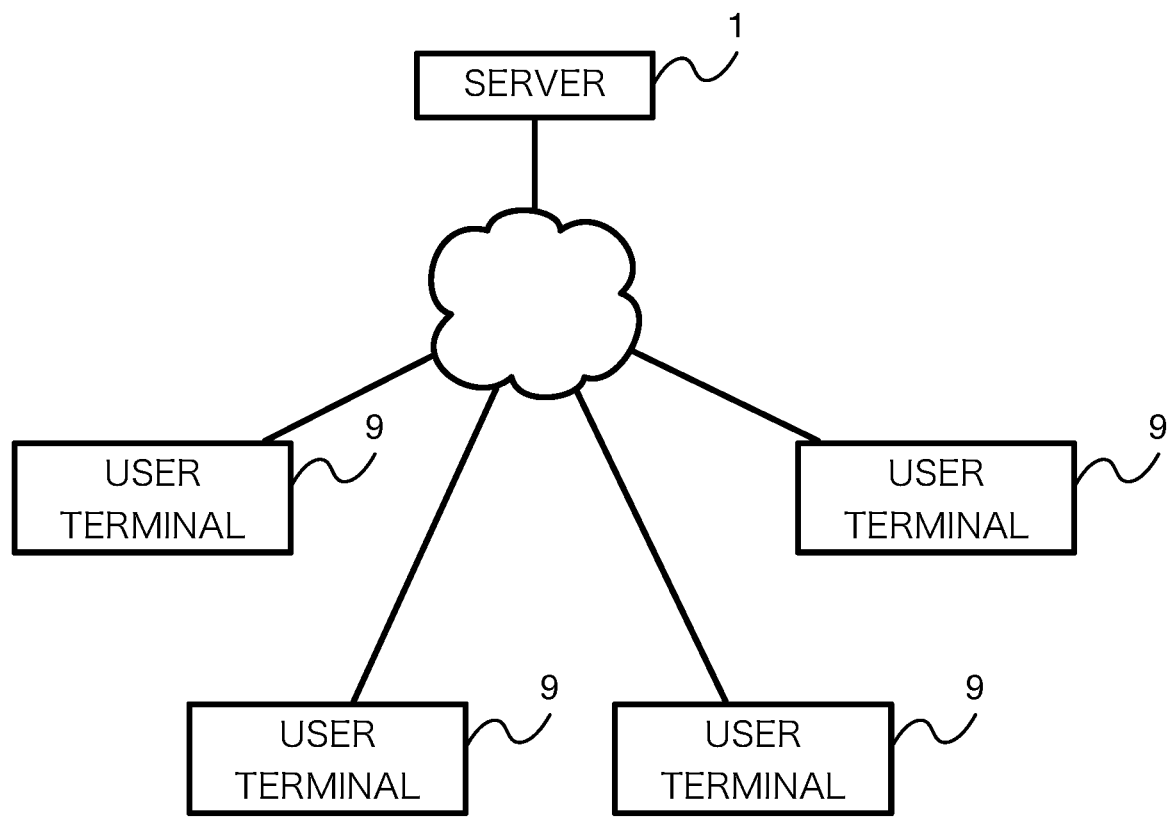
FIG. 1 is a schematic diagram illustrating a configuration of an information processing system according to an embodiment.

FIG. 1 is a schematic diagram illustrating a system configuration according to the present embodiment. The system according to the present embodiment is provided with a content distributing server 1, and one or a plurality of user terminals 9, which are capable of communication with each other, by being connected to a network.

Figure 2:
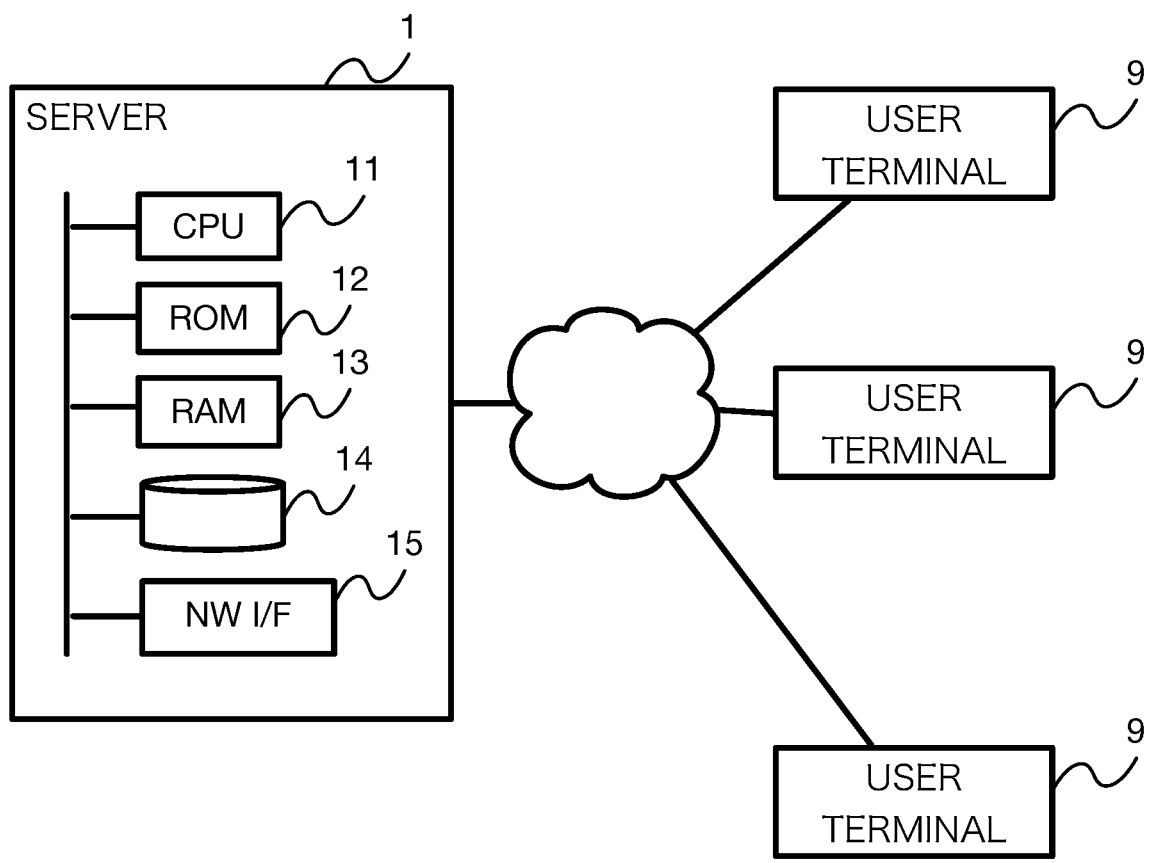
FIG. 2 is a diagram schematically illustrating a hardware configuration of the information processing system according to the embodiment.

FIG. 2 is a diagram illustrating a schematic hardware configuration of the system according to the present embodiment. The content distributing server 1 is a server for distributing content such as coupons and so forth to users. The content distributing server 1 is a computer that is provided with a central processing unit (CPU) 11, read-only memory (ROM) 12, random access memory (RAM) 13, a storage device 14 such as electrically erasable and programmable read-only memory (EEPROM) or a hard disk drive (HDD) or the like, a communication unit 15 such as a network interface card (NIC) or the like, and so forth. Note however, that specific hardware configurations of the content distributing server 1 may be omitted, replaced, or added as appropriate in accordance with the form of implementation. Further, the content distributing server 1 is not limited to a device with a single housing. The content distributing server 1 may be realized by a plurality of devices, using technology of the so-called cloud or distributed computing, or the like.

The user terminal 9 is a terminal device used by a user. The user terminal 9 is a computer that is provided with a CPU, ROM, RAM, a storage device, a communication unit, an input device, an output device, and so forth (omitted from illustration). Also, the user terminal 9 is not limited to a device with a single housing. The user terminal 9 may be realized by a plurality of devices, using technology of the so-called cloud or distributed computing, or the like. The user uses various types of services provided by the content distributing server 1 via such user terminals 9.

Figure 3:
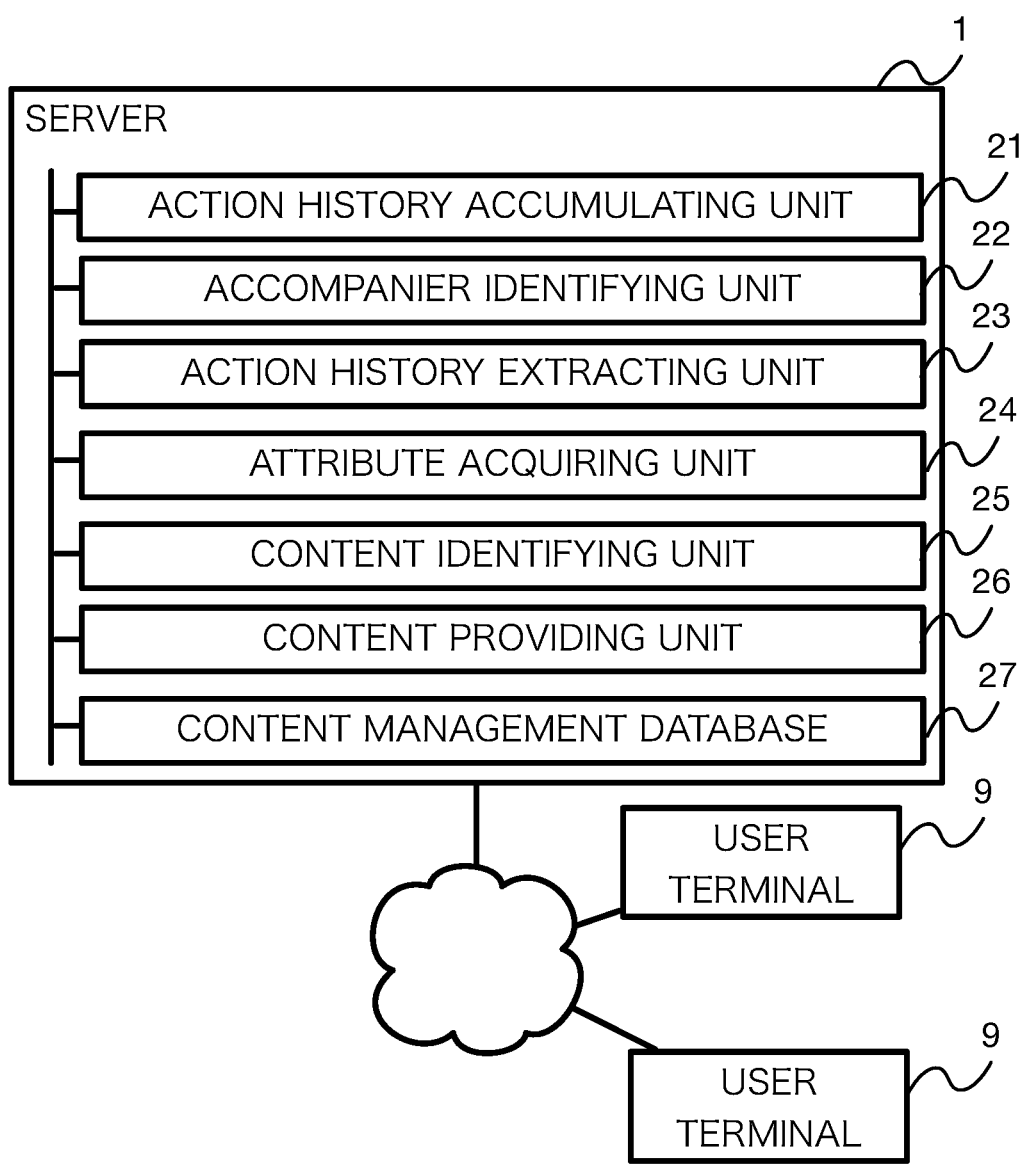
FIG. 3 is a diagram schematically illustrating a functional configuration of the information processing system according to the embodiment.

FIG. 3 is a diagram schematically illustrating a functional configuration of the information processing system according to the present embodiment. The content distributing server 1 functions as an information processing device that is provided with an action history accumulating unit 21, an accompanier identifying unit 22, an action history extracting unit 23, an attribute acquiring unit 24, a content identifying unit 25, a content providing unit 26, and a content management database 27, by programs recorded in the storage device 14 being read out to the RAM 13, and executed by the CPU 11, thereby controlling each of the pieces of hardware that the content distributing server 1 is provided with. Note that while the functions that the content distributing server 1 is provided with are executed by the CPU 11 that is a general-purpose processor in the present embodiment and later-described other embodiments, part or all of these functions may be executed by one or a plurality of dedicated processors.

The action history accumulating unit 21 accumulates action history, in which identification information of another user who is accompanying the user (hereinafter, "accompanier") when the user engages in predetermined actions (activities) is correlated, as action history of the user. Information by which the user terminal of the accompanier can be identified is used as identification information of the accompanier in the present embodiment. More specifically, in the present embodiment, the action history accumulating unit 21 accumulates information capable of identifying another user terminal that has been present within a predetermined distance (e.g., 1.0 meter) of the user terminal of the user for a predetermined amount of time (e.g., five to ten minutes) or more, when the user engages in a predetermined action, as identification information of the accompanier.

FIG. 4 is a diagram illustrating an example of action history of a user that is accumulated in the present embodiment. In the present embodiment, the action history data includes user ID, action of the user, the date and time relating to that action, facility/service information relating to that action, attribute (category) of that action, and accompanier identification information, and is accumulated each time the user engages in a predetermined action. The facility/service information here is information indicating a facility or a service regarding which the user has engaged in the action. Examples included are facilities such as eateries or retail shops or the like, home delivery services such as catering, experience-based services such as gaming, playing, or the like, and so forth. Also, the attribute is information used to classify the facilities or the services regarding which the user has engaged in the action, and to estimate the range of interest of the user. Examples included are the category or usage of the shop or eatery, the price range, and further home-delivery services, games, and so forth. A plurality of attributes may be recorded for one piece of action history data.

In the present embodiment, a predetermined action that serves as a trigger to accumulate action history is imparting/using of points, payment/settlement, using provided content (e.g., using a coupon), and so forth. Out of the data to be accumulated as action history, action of the user, date and time, and facility/service information are acquired from an external system used when the user engages in the predetermined action (e.g., a point managing system, settlement system, system for managing provided content) or the like. Also, when the user engages in the predetermined action, point information or settlement information of the user stored correlated with a user ID in a user database (omitted from illustration) or the like in the server 1 may be accumulated, for example. Settlement information here is information necessary for performing settlement, and includes, for example, credit card information, account information for electronic value (e.g., electronic money or points), account information for virtual currency, bank account information, debit card information, and so forth. The point information and settlement information are registered at the time of user registration or the like, and may be stored correlated with a user ID in the user database in the server 1, for example, or may be stored in an external system.

Note however, that the object of being comprehended as an "action" by the user and recorded as action history in the technology according to the present disclosure is not limited to the exemplification in the present embodiment. For example, usage of facilities or services, activities engaged in with an accompanier (types or categories such as leisure, games, sports, or the like) may in themselves be comprehended as being "actions", and be recorded in the action history of the user. The action history accumulating unit 21 can also acquire such action history from an external system used when the user uses the facilities or services.

When actions of the user, date and time, and facilities/services information are acquired from the external system, the action history accumulating unit 21 thereafter identifies an accompanier of the user at the date and time from later-described user situation information, and accumulates the action history along with the identification information of the identified accompanier. The action history accumulating unit 21 also acquires attributes corresponding to the action or the facilities/services, on the basis of a correlation table (omitted from illustration) of facilities/services and attributes defined in advance. Note however, that the method of acquiring attributes is not limited to the exemplification in the present embodiment. For example, attributes may be acquired by machine learning of data collected from a wide-area network such as the Internet or the like, or by a technique of performing clustering of actions or facilities/services on the basis of collected data. Further, the data format of action history and increments of accumulating action history are not limited to the exemplification in the present embodiment.

The accompanier identifying unit 22 identifies the current accompanier(s) of the user. In the present embodiment, the accompanier identifying unit 22 identifies one or more other users who currently are present within a predetermined distance from the user terminal as the one or more current accompaniers of the user, on the basis of position information or nearby terminal information acquired from the user terminal. Now, position information measured on the basis of the Global Positioning System (GPS) or an access point of a wireless local area network (LAN), base station information of a cellular phone network, or the like, for example, can be used for the position information. User terminal identification information acquired by Near-Field Communication (e.g., BLUETOOTH™) among user terminals can be used for the nearby terminal information. Note however, that the specific method employed to identify an accompanier is not limited to the exemplification in the present embodiment. For example, the accompanier may be identified from a schedule registered in advance by the user, or by a method of analyzing the content of communication data shared by the user, or the like.

FIG. 5 is a diagram illustrating an example of a data format of user situation information managed in the present embodiment. In the present embodiment, the accompanier identifying unit 22 saves current-position information of the user (specifically, coordinates acquired by GPS or the like), accompanier identification information, and information acquisition date and time, correlated with the user ID, thereby managing user situation information. Accordingly, each time position information of the user terminal is acquired, the accompanier identifying unit 22 updates the current-position information of the user, the accompanier identification information, and the information acquisition date and time in the user situation information, correlated with the user ID of the user terminal.

It should be noted, however, that the configuration of user situation information shown in the present embodiment is an example of data configuration for identifying the accompanier of the user, and data for identifying the accompanier of the user is not limited to the example of the user situation information such as shown in FIG. 5. For example, it is possible to identify the accompanier on the basis of user terminal identification information obtained by Near-Field Communication among user terminals alone, without acquiring position information of the user. In a case of employing such a technique, it is sufficient to update just the accompanier identification information and the information acquisition date and time, and position information of the user does not have to be recorded in the user situation information.

The action history extracting unit 23 extracts, from the action history accumulated by the action history accumulating unit 21, action history correlated with the identification information of the accompanier identified by the accompanier identifying unit 22.

The attribute acquiring unit 24 acquires an attribute of a facility or a service relating to the action history extracted by the action history extracting unit 23.

The content identifying unit 25 identifies content corresponding to the extracted action history, as content to be provided to the user. In the present embodiment, the content identifying unit 25 identifies, as content corresponding to the action history, content for a facility or service of which an attribute has a predetermined association (e.g., the same) with the attribute acquired by the attribute acquiring unit 24. Note that description is made in the present embodiment regarding a content identifying technique in which the attribute being the same (in a case in which a plurality of attributes are set, at least part of the attributes are in common) is a condition for the predetermined association. However, the attribute acquired by the attribute acquiring unit 24 and the attribute relating to the identified content do not have to be the same. For example, the content identifying unit 25 may identify content relating to another attribute having a predetermined association with the acquired attribute, on the basis of a list summarizing attributes that have association with each other, data indicating distances among attributes, or the like.

Also, the content identifying unit 25 may identify content that is usable with no more than a predetermined amount of labor for the user, such as for example, content or the like usable at a location within a predetermined distance from the position of the user or a location to which the user can travel within a predetermined amount of time. More specifically, the content identifying unit 25 acquires position information of a location where content can be used, and on the basis of this position information and the current position information of the user, acquires the distance to the location where the content will be used, or the amount of travel time thereto from the current position of the user. At this time, acquisition of the distance or travel time may involve using external services, such as map information services, mass transit transfer information services, and so forth. The content identifying unit 25 then identifies content relating to a usage location regarding which the acquired distance or the travel time is no more than a predetermined reference, as content to be provided to the user.

FIG. 6 is a diagram illustrating an overview of content management data for managing content provided to the user in the present embodiment. The content provided in the present embodiment is bonus content (so-called coupons) that enable the user to receive bonuses such as discounts, imparted points, or the like, when the user uses facilities/services. The content management database 27 accumulates and manages, for each type of content that are provided, information such as a content ID, facilities/services for which the content can be used, attributes, period of validity, locations where the content can be used (position information), and so forth. Additionally, an upper limit may be set for the content, regarding how many can be provided, and so forth. That is to say, in the present embodiment, by referencing the information accumulated in the content management database 27, the content identifying unit 25 identifies content that have predetermined association with attributes acquired by the attribute acquiring unit 24, that can be used with no more than a predetermined amount of labor for the user, that are still valid, and that have not reached the upper limit of the number that can be provided. Conditions other than those exemplified in the present embodiment may also be set for the content.

Although an example is described in the present embodiment regarding bonus content such as coupons or the like being provided to the user, the types of content provided to the user is not limited to those exemplified in the present embodiment. For example, various types of content, such as tickets, music/image data, applications, and so forth, may be provided as content.

The content providing unit 26 provides the user with the content identified by the content identifying unit 25.

Flow of Processing

Next, a flow of processing carried out by the information processing system according to the present embodiment will be described. Note that the specific content of processing and the processing order thereof described below are one example of carrying out the present disclosure. Specific processing content and the order of processing may be selected as appropriate in accordance with the embodiment of the present disclosure.

FIG. 7 is a flowchart showing the flow of the content identifying processing according to the present embodiment. The processing shown in this flowchart is carried out, triggered by the content distributing server 1 receiving, from a user terminal, position information or nearby terminal information of the user terminal. More specifically, when an application running on a user terminal carried by a user performs search processing for nearby facilities/services (e.g., a search for nearby eateries), the user is prompted to approve acquisition and transmission of the position information or nearby terminal information, and upon the user performing an approval operation, the user terminal that has received the approval acquires the position information or nearby terminal information, which is then transmitted to the content distributing server 1, for example. The processing shown in this flowchart is executed, triggered by the content distributing server 1 receiving information transmitted from the user terminal in this way.

In steps S101 and S102, a current accompanier of the user is identified. The accompanier identifying unit 22 receives, from the user terminal, position information of the user terminal or nearby terminal information of the user terminal (step S101).

The accompanier identifying unit 22 then identifies the user ID of the user related to the user terminal, on the basis of identification information used in communication with the user terminal, and updates the current position information (in a case of reception thereof), accompanier identification information, and information acquisition date and time, in the user situation information corresponding to the specified user ID. Now, in a case in which the received information is position information of the user terminal, the accompanier identifying unit 22 records, out of user situation information according to other user IDs, another user ID relating to other user situation information regarding which position information near to the received position information is recorded, as the accompanier identification information. Conversely, in a case in which the received information is nearby terminal information, the accompanier identifying unit 22 records the nearby terminal information itself, or another user ID corresponding to the nearby terminal information, as the accompanier identification information. The accompanier identifying unit 22 then identifies one or a plurality of other users relating to the recorded accompanier identification information as accompaniers of the information transmission source user (step S102). Thereafter, the processing advances to step S103.

In step S103, past action history regarding the current accompanier is extracted. The action history extracting unit 23 extracts action history correlated with the identification information of the accompanier identified in step S102, from the accumulated action history. At this time, it is sufficient for accompaniers identified in step S102 and accompaniers recorded in the extracted action history to be partially in common. For example, in a case in which the accompaniers identified in step S102 are user A, user B, and user C, the action history extracting unit 23 may extract action history in which one or more of the user A, the user B, and the user C is recorded as an accompanier, or may extract action history in which the user D is recorded, in addition to the user A, the user B, and the user C, as an accompanier. Thereafter, the processing advances to step S104.

In steps S104 and S105, content is identified on the basis of the action history. The attribute acquiring unit 24 acquires attributes recorded in the action history extracted in step S103 (step S104). The content identifying unit 25 then searches for and identifies content for facilities or services having attributes with a predetermined association (e.g., the same) with the attributes acquired in step S103, by searching the content management database 27 (step S105). A plurality of content may be identified at this time. Thereafter, the processing advances to step S106.

In step S106, content is provided to the user and/or the accompanier. The content providing unit 26 provides the content identified in step S105 to at least one or more of the user of the transmission source user terminal of the information received in step S101, and the accompaniers identified in step S102. Details of those receiving provision, such as whether the content is provided to only part of or all of the user and accompaniers, and further, how many to provide to in a case of provided to only part, and so forth may be defined in the content management database 27 in advance for each of the content. Thereafter, the processing shown in this flowchart ends.

The user who has been provided with the content can use the provided content. For example, in a case in which the content is bonus content such as a coupon or the like, or tickets, the user terminal of the user who has been provided with the content can receive the content in the form of coupon codes or ticket codes or the like from the content distributing server 1, and cause the content to be read by a system of a facility/service provider or the like, so as to use the content. Also, in a case in which the content is music/image data, application or the like, the user terminal of the user who has been provided with of the content downloads content such as the music/image data, applications or the like, from the content distributing server 1, which is played or executed at the user terminal, so as to use the content. Any method can be used for the providing of content, examples of which include email, push notifications, banner notifications, audio notifications, and various media such as social networking services (SNS), message apps, and so forth.

Note that the content provided here may be content that is advantageous to accompaniers of the user when used by the user. For example, in a case in which the content is bonus content such as coupon or the like, an arrangement may be made in which when one of the user and accompaniers uses the bonus content, other users and accompaniers can receive the advantages of the bonus content, such as discounts, point impartation, and so forth.

Also, when content is used, the content distributing server 1 is notified of the results of usage, and the action history accumulating unit 21 accumulates the action history of the user involving usage of the content, in a manner correlated with the identification information of the accompaniers as action history of the user. The action history accumulated here is referenced by the action history extracting unit 23 and the attribute acquiring unit 24 when an accompanier of the user is identified by the accompanier identifying unit 22 the next time.

According to the system of the embodiment described above, by identifying content in accordance with the current situation of the user on the basis of past action history of the user, content that have a high probability of being used by the user can be identified and provided. That is to say, according to the system of the present embodiment, a case will be assumed, for example, where there is a tendency in which a user X, to whom coupon is distributed, often dines at diners when dining with a user A, and often dines at upscale restaurants when dining with a user B. In this case, when user X is being accompanied by user B, user X can be provided with coupons for upscale restaurants where the probability of visiting with user B is estimated to be high, instead of coupons for diners where the probability of user X visiting with user B is estimated to be low.

Variations

Although an example of identifying current accompaniers of the user has been described in the embodiment described above, the identified accompaniers may be future accompaniers of the user. In this case, the accompanier identifying unit 22 identifies users of other user terminals estimated to be present within a predetermined distance from the user terminal of the user within a predetermined amount of time as being future accompaniers of the user. For example, the accompanier identifying unit 22 can identify other users who will join with the user (i.e., future accompaniers) by predicting traveling route, destination, time of arrival, etc., of the user, on the basis of the position information or the nearby terminal information acquired from the user terminal of the user. This variation is substantially the same as the above-described embodiment except for the point that the identified accompaniers are future accompaniers, and accordingly description will be omitted.

Thus, by estimating future accompaniers of the user, suitable content can be identified in advance, and the content can be provided at a timing before the user joins with the accompaniers or immediately thereafter, thereby affecting decision-making of the user.

What is claimed is:

1. An information processing device, connected to a network and is capable of communicating with a plurality of user terminals via the network, the information processing device comprising:
    a memory; and
    a processor coupled to the memory, the processor being configured read and operate according to computer program code, the computer program code configured to cause the processor to execute:
    acquiring a current position information of a user terminal of a user based on at least one of a global positioning system (GPS), an access point of a wireless local area network (LAN), or base station information of a cellular phone network;
    identifying a user terminal of at least one current accompanier of the user based on the acquired current position information, wherein each time the current position information of the user terminal is acquired, accompanier identification information of the at least one current accompanier associated with the current position information of the user terminal is updated;
    identifying a user terminal of at least one future accompanier of the user by performing:
        predicting information including a traveling route and a time of arrival with respect to traveling of the user based on the acquired position information that continues to be updated;
        estimating one or more other user terminals to be present within a predetermined distance from the user terminal of the user within a predetermined amount of time based on the predicted information; and
        identifying one or more users of the estimated one or more other user terminals as the at least one future accompanier of the user;
    extracting, from action history accumulated regarding the user, action history in which identification information of the at least one current and the at least one future accompaniers identified by the processor is correlated;
    identifying content corresponding to the extracted action history, as content to be provided to the user, wherein content, which has a high probability of being used by the user in view of the user being accompanied with the at least one current accompanier and expected to be accompanied with the at least one future accompanier, is identified based on the extracted action history correlated with both the identified at least one current accompanier and the at least one future accompanier and is provided to the user; and
    accumulating action history, in which identification information of one or more accompaniers when the user engaged in a predetermined action is correlated, as action history of the user,
    wherein the processor is configured to extract action history correlated with the identification information of the at least one current and the at least one future accompaniers, from the action history accumulated by the processor, and
    wherein the processor is configured to exclude, from the content to be provided to the user, content that has a high probability of being used by the user based on the extracted action history correlated with the user but is not correlated with the at least one current and at least one future accompaniers.

2. The information processing device according to claim 1, wherein the processor further executes:
    acquiring an attribute of a facility or a service related to action history extracted by the processor, and
    wherein the processor identifies the content for a facility or a service having an attribute with a predetermined association with the acquired attribute, as the content corresponding to the action history.

3. The information processing device according to claim 1,
    wherein the processor identifies, as the content to be provided to the user, the content that is usable with no more than a predetermined amount of labor for the user.

4. The information processing device according to claim 3,
    wherein the processor identifies, as the content that is usable with no more than a predetermined amount of labor, the content usable at a location within a predetermined distance from a position of the user or a location to which the user can travel within a predetermined amount of time.

5. The information processing device according to claim 1, wherein the processor further executes:
    providing the user with the content identified by the processor.

6. The information processing device according to claim 1,
    wherein the content provided by the processor is advantageous to the at least one current and the at least one future accompaniers of the user when used by the user.

7. The information processing device according to claim 6,
    wherein the content provided by the processor is bonus content, and when the user uses the bonus content, the at least one current and the at least one future accompaniers of the user receive advantages of the bonus.

8. A method executed by a computer connected to a network and is capable of communicating with a plurality of user terminals via the network, the method comprising:
    acquiring a current position information of a user terminal of a user based on at least one of a global positioning system (GPS), an access point of a wireless local area network (LAN), or base station information of a cellular phone network;
    identifying a user terminal of at least one current accompanier of the user based on the acquired current position information, wherein each time the current position information of the user terminal is acquired, accompanier identification information of the at least one current accompanier associated with the current position information of the user terminal is updated;

identifying a user terminal of at least one future accompanier of the user by performing:
    predicting information including a traveling route and a time of arrival with respect to traveling of the user based on the acquired position information that continues to be updated;
    estimating one or more other user terminals to be present within a predetermined distance from the user terminal of the user within a predetermined amount of time based on the predicted information; and
    identifying one or more users of the estimated one or more other user terminals as the at least one future accompanier of the user;
extracting, from action history accumulated regarding the user, action history in which identification information of the at least one current and the at least one future accompaniers identified by the computer is correlated;
identifying content corresponding to the extracted action history, as content to be provided to the user, wherein content, which has a high probability of being used by the user in view of the user being accompanied with the at least one current accompanier and expected to be accompanied with the at least one future accompanier, is identified based on the extracted action history correlated with both the identified at least one current accompanier and the at least one future accompanier, and is provided to the user; and
accumulating action history, in which identification information of one or more accompaniers when the user engaged in a predetermined action is correlated, as action history of the user,
wherein the computer extracts action history correlated with the identification information of the at least one current and the at least one future accompaniers, from the action history accumulated by the computer, and
wherein the method further comprises excluding, from the content to be provided to the user, content that has a high probability of being used by the user based on the extracted action history correlated with the user but is not correlated with the at least one current and at least one future accompaniers.

9. A non-transitory computer-readable recording medium having recorded thereon a program to be executed by a computer, which is connected to a network and is capable of communicating with a plurality of user terminals via the network, wherein the program causes the computer to execute:
    acquiring a current position information of a user terminal of a user based on at least one of a global positioning system (GPS), an access point of a wireless local area network (LAN), or base station information of a cellular phone network;
    identifying a user terminal of at least one current accompanier of the user based on the acquired current position information, wherein each time the current position information of the user terminal is acquired, accompanier identification information of the at least one current accompanier associated with the current position information of the user terminal is updated;
    identifying a user terminal of at least one future accompanier of the user by performing:
        predicting information including a traveling route and a time of arrival with respect to traveling of the user based on the acquired position information that continues to be updated;
        estimating one or more other user terminals to be present within a predetermined distance from the user terminal of the user within a predetermined amount of time based on the predicted information; and
        identifying one or more users of the estimated one or more other user terminals as the at least one future accompanier of the user;
    extracting, from action history accumulated regarding the user, action history in which identification information of the at least one current and the at least one future accompaniers identified by the computer is correlated;
    identifying content corresponding to the extracted action history, as content to be provided to the user, wherein content, which has a high probability of being used by the user in view of the user being accompanied with the at least one current accompanier and expected to be accompanied with the at least one future accompanier, is identified based on the extracted action history correlated with both the identified at least one current accompanier and the at least one future accompanier, and is provided to the user; and
    accumulating action history, in which identification information of one or more accompaniers when the user engaged in a predetermined action is correlated, as action history of the user,
    wherein the program further causes the computer to extract action history correlated with the identification information of the at least one current and the at least one future accompaniers, from the action history accumulated by the computer, and
    wherein the program further causes the computer to exclude, from the content to be provided to the user, content that has a high probability of being used by the user based on the extracted action history correlated with the user but is not correlated with the at least one current and at least one future accompaniers.

10. The information processing device according to claim 1, wherein the processor accumulates information, by which another user terminal that was present within the predetermined distance from the user terminal of the user for a predetermined amount of time or more when the user engaged in the predetermined action is identifiable, as the identification information of the one or more accompaniers.

11. The method according to claim 8, wherein the computer accumulates information, by which another user terminal that was present within the predetermined distance from the user terminal of the user for a predetermined amount of time or more when the user engaged in the predetermined action is identifiable, as the identification information of the one or more accompaniers.

12. The computer-readable recording medium according to claim 9, wherein the computer accumulates information, by which another user terminal that was present within the predetermined distance from the user terminal of the user for a predetermined amount of time or more when the user engaged in the predetermined action is identifiable, as the identification information of the one or more accompaniers.

* * * * *